(12) United States Patent
Galli et al.

(10) Patent No.: US 6,500,881 B1
(45) Date of Patent: Dec. 31, 2002

(54) FLAME-PROOFED POLYAMIDE COMPOSITION

(75) Inventors: Daniele Galli, Comense (IT); Franco Speroni, Ceriano Laghetto (IT)

(73) Assignee: Rhodia Engineering Plastics S.r.l., Ceriano Laghetto (IT)

( * ) Notice: Subject to any disclaimer, the term of this patent is extended or adjusted under 35 U.S.C. 154(b) by 0 days.

(21) Appl. No.: 09/601,877

(22) PCT Filed: Feb. 5, 1999

(86) PCT No.: PCT/EP99/00761

§ 371 (c)(1),
(2), (4) Date: Oct. 10, 2000

(87) PCT Pub. No.: WO99/41309

PCT Pub. Date: Aug. 19, 1999

(30) Foreign Application Priority Data

Feb. 11, 1998 (FR) .............................. 98 01860

(51) Int. Cl.⁷ .......................... C08K 5/34; C08K 5/09; C08K 5/10; C08K 3/34; C08K 3/40
(52) U.S. Cl. ........ 523/205; 524/100; 524/300; 524/303; 524/321; 524/447; 524/494
(58) Field of Search .......... 523/205; 524/100, 524/447, 494, 300, 303, 321

(56) References Cited

U.S. PATENT DOCUMENTS 4,511,684 A * 4/1985 Schmid et al. .............. 524/101

FOREIGN PATENT DOCUMENTS

| DE | 37 22 118 | 1/1989 |
|---|---|---|
| EP | 0 101 207 A | 7/1983 |
| GB | 2 097 008 | 3/1982 |

OTHER PUBLICATIONS

Patent Abstracts of Japan, vol. 008, No. 279 (C–257), Dec. 20, 1984 & JP 59 149955 A (Asahi Kasei Kogyo KK), Aug. 28, 1984 see abstract & Database WPI, Week 8440, Derwent Publications Ltd., London, GB; AN 84–247460, "arc resistant polyamide composition" see abstract.

Chemical Abstracts, vol. 91, No. 2, Jul. 9, 1979, Columbus, Ohio, US; Abstract No. 5930, "Fire–resistant polyamide compositions" XP002080610, see abstract & JP 54 016565 A (Nissan et al).

* cited by examiner

Primary Examiner—Kriellion A. Sanders
(74) Attorney, Agent, or Firm—Burns, Doane, Swecker & Mathis, L.L.P.

(57) ABSTRACT

The invention concerns a flame-proofed polyamide composition to be used in particular for making moulded objects. The composition comprises a flame-proofing system consisting of a melamine derivative and a mineral filler consisting of calcined kaolin and is particularly useful for making moulded electrical objects.

15 Claims, No Drawings

FLAME-PROOFED POLYAMIDE COMPOSITION

The present invention relates to a fire-retarded polyamide composition, especially one that can be used for the manufacture of moulded articles.

It relates more particularly to a polyamide composition fire-retarded by a fire-retardant system without any halogen or phosphorus.

Polyamide-resin-based compositions are used for the production of articles by various forming processes denoted by the generic term "moulding". These articles are used in many technical fields. Among these, the production of components in electrical or electronic systems is a major application requiring special properties. Thus, these components must have high mechanical properties but also properties of chemical resistance, electrical insulation and, above all high fire resistance.

The fire retardation of polyamide-resin-based compositions has been studied for a very long time. Thus, the main fire retardants used are red phosphorus and halogen compounds such as dibromophenol, polybromodiphenyls, polybromodiphenoxides and brominated polystyrene(s). Over the last twenty years, a new class of fire retardants has been found, namely organic nitrogen compounds belonging to the triazine class, such as melamine or its derivatives, such as melamine cyanurate, and more recently phosphates, polyphosphates and melamine pyrophosphates.

The advantage of the latter class of fire retardants is that the compounds in question contain no halogens or free phosphorus. This is because fire retardants containing halogens or red phosphorus can generate toxic gases or vapours during combustion of the polyamide composition. However, the melamine compounds used by themselves do not make it possible to obtain satisfactory fire retardation of the polyamide-based compositions, especially when they contain reinforcing fillers in the form of fibres, such as glass fibres, mineral fibres or thermostable organic fibres. Furthermore, the melamine compounds fluidizing the polyamide when it burns cause the formation of drops. This drop formation is problematic and can result in the products with which they come into contact, such as the cotton in the UL 94 test described below, catching fire.

To solve this problem, it has been proposed, as described in U.S. Pat. No. 5,482,985, to combine the melamine compound with another compound such as a mineral filler like magnesium hydroxide. However, the amount of melamine compound needed to obtain the desired fire-retardation properties is always of a high level. This high concentration of melamine compound has certain drawbacks, especially during the manufacture of the composition, such as production of vapour of the melamine compounds or, during production of moulded articles, such as obstruction of the venting ducts and deposits formed in the moulds.

The objective of the present invention is especially to remedy these drawbacks by providing a novel fire-retardation system based on melamine compounds with a relatively low content of melamine compound.

For this purpose, the invention provides a polyamide-based composition comprising a fire-retardation system, characterized in that this fire-retardation system consists of a melamine derivative and a mineral filler consisting of kaolin.

According to another characteristic of the invention, the weight concentration of melamine derivative is between 1 and 30% by weight with respect to the weight of polyamide resin and advantageously between 7 and 10% by weight.

According to yet another characteristic, the weight concentration of kaolin is between 5 and 40% by weight with respect to the weight of polyamide resin. Advantageously, this concentration is between 10 and 30% by weight.

According to a preferred embodiment of the invention, the kaolin is a calcined kaolin.

Thus, by way of example, the calcined kaolins suitable for the invention may be obtained from hydrated aluminosilicates, called kaolinite, which are treated by a hot dehydration process.

These fillers, used in filled polyamide-based compositions, give these compositions properties which are highly isotropic in nature.

The kaolins used in the present invention are preferably treated on the surface by coupling agents, such as aminosilanes, in order to improve their compatibility with the polyamide.

The density of the kaolins is typically equal to approximately 2.6–2.65 g/cm$^3$. The mean size of the kaolin particles is less than 2 $\mu$m.

According to another characteristic of the invention, the fire-retardant system comprises a compound containing at least one carboxylic acid functional group and having a low vapour pressure at the temperatures at which it is mixed with the polymeric matrix, especially during the process for manufacturing the compound, for example at temperatures of between approximately 200° C. and approximately 350° C. As examples of suitable carboxylic acids, mention may be made of monocarboxylic acids, such as myristic acid, palmitic acid, stearic acid, behenic acid, benzoic acid, salicylic acid and, in general, monocarboxylic acids containing a greater number of carbon atoms than 10, dicarboxylic acids, such as oxalic acid, malonic acid, succinic acid, glutaric acid, adipic acid, pimelic acid, decanedioic acid, dodecanedioic acid, isophthalic acid and terephthalic acid, or polycarboxylic acids, such as trimesic acid. This compound, by reduction in the chain lengths of the polyamide when the latter is melted by the flame, causes the formation of small drops, therefore having a high surface-area/mass ratio. Thus, the temperature of these drops will very rapidly decrease and they will no longer be able to ignite the elements with which they come into contact.

Advantageously, the mono-, di- or polycarboxylic acid is present in a weight concentration of between 0.01% and 3% with respect to the polyamide resin, preferably between 0.05% and 1%.

The polyamide is chosen from the group comprising the polyamides obtained by polycondensation of a linear dicarboxylic acid with a linear or cyclic diamine, such as PA-6,6, PA-6,10, PA-6,12, PA-12,12, PA-4,6 and MXD-6, or between an aromatic dicarboxylic acid and a linear or aromatic diamine, such as polyterephthalamides, polyisophthalamides and polyaramides, polyamides obtained by the polycondensation of an amino acid with itself, the amino acid possibly being generated by the hydrolytic opening of a lactam ring, such as, for example, PA-6, PA-7, PA-11 and PA-12. The process of the invention is also suitable for treating copolyamides derived especially from the above polyamides, or blends of these polyamides or copolyamides.

The preferred polyamides are polyhexamethylene adipamide, polycaprolactam, or copolymers and blends of polyhexamethylene adipamide with polycaprolactam.

The melamine derivatives or compounds suitable for the invention are chosen from the group comprising melamine cyanurate, described in Japanese Patents JP-A-53/51250, JP-A-54/118454 and JP-A-54/16564, and melamine phosphates and polyphosphates, described in Patent WO 96/09344.

According to another characteristic of the invention, the composition contains reinforcing fillers chosen from the group comprising glass fibres, mineral fibres, such as ceramic fibres, thermosetting organic fibres, such as polyphthalamide fibres.

The weight concentration of reinforcing fillers is advantageously between 1% and 50% by weight with respect to the weight of polyamide resin.

The compositions of the invention may contain all the additives normally used in polyamide-based compositions used for the manufacture of moulded articles. Thus, by way of examples of additives, mention may be made of heat stabilizers, UV stabilizers, antioxidants, lubricants, pigments, colorants, plasticizers and impact modifiers.

By way of example, the antioxidants and heat stabilizers are, for example, alkali metal halides, copper halides, sterically hindered phenolic compounds, and aromatic amines.

The UV stabilizers are generally benzotriazoles, benzophenones or HALS.

The compositions of the invention are obtained by mixing the various constituents, generally in a single-screw or twin-screw extruder, at a temperature high enough to keep the polyamide resin in the molten state. In general, the polymer compound obtained is extruded in the form of rods which are cut into pieces in order to form granules.

Adding the fire-retardant system or the additives may be carried out by addition of these compounds into the polyamide melt in pure form or in the form of a masterbatch in a resin such as, for example, a polyamide resin.

The granules obtained are used as raw material supplied in processes for manufacturing moulded articles, such as injection moulding, extrusion, extrusion-blow moulding processes.

Thus, the composition of the invention is particularly suitable for the manufacture of articles used in the field of electrical or electronic connection technology, such as components for circuit breakers, switches, connectors or the like.

The properties of the compositions of the invention are determined on test pieces, using the following methods:

Flame resistance: UL-94 test according to the Underwriters Laboratories procedure. This test is carried out on test pieces with a thickness of 1.6 mm and 0.8 mm. The results are expressed as the following ratings:

UC: unclassified (little fire retardation)

V-2: the mean combustion time is less than 25 seconds (self-extinguishability), polyamide drops igniting the cotton;

V-1: mean combustion time less than 25 seconds (self-extinguishability), no ignition of the cotton by the drops;

V-0: mean combustion time less than 5 seconds (self-extinguishability), no ignition of the cotton.

Incandescent-wire resistance measured according to the IEC 695-2-1 standard on test pieces having a thickness of 3.0 mm, 1.6 mm and 1 mm.

The mechanical properties are determined using the following methods:

tensile strength according to the ISO R 527 standard after conditioning the test piece at 23° C. and a relative humidity of 50%;

elongation at break according to the ISO 527 standard;

modulus according to the ISO 527 standard;

IZOD impact strength according to the ISO 179/IeU standard;

CHARPY impact strength according to the ISO 179/IeA standard;

electric-arc propagation resistance according to the IEC 112 standard.

HDT, heat-distortion temperature under a load of 1.81 MPa, according to the ISO 75 standard;

melt flow index (MFI) (g/10 min) determined according to the ASTM 1238 standard;

viscosity index measured using a solution of polymer in formic acid according to the ISO 307 standard.

The invention is illustrated by the examples below, these being given solely by way of indication and placing no limitation on the scope of the invention.

Various compositions were manufactured by compounding a polyamide with a melamine cyanurate, a mineral filler of the kaolin type and glass fibres.

The compound is produced in a single-screw extruder at a temperature of 250° C. The compound is extruded in the form of rods in order to form granules by cutting these rods.

The materials used are:

Polyamide $A_1$: polyhexamethylene adipamide (PA-6,6) of relative viscosity (IV) equal to 126

Polyamide $A_2$: copolyamide comprising 90% PA-6,6 units and 10% polycaprolactam (PA-6) units, of relative viscosity (IV) equal to 142

Polyamide $A_3$: polycaprolactam (PA-6) of relative viscosity (IV) equal to 148

Melamine compound B: melamine cyanurate sold under the trade name "MELAPUR MC 25"

Mineral filler $C_1$: calcined kaolin sold under the trade name "TRANSLINK 445"

Mineral filler $C_2$: wollastonite

Glass fibres D: glass fibres 10 µm in diameter, in the form of chopped strands.

The concentration of each component is indicated in the table below.

All these composition comprise 0.5% by weight of lubricant and antioxidant additives and 0.5% of isophthalic acid.

| Ex. | Components | Melamine cyanurate | Mineral filler | Glass fibers |
| --- | --- | --- | --- | --- |
| 1 | $A_1$: 56%<br>$A_3$: 10% | 8% | $C_1$: 25% | 0% |
| 2 | $A_1$: 56%<br>$A_3$: 10% | 8% | $C_1$: 20% | 5% |
| 3 | $A_2$: 66% | 8% | $C_1$: 25% | 0% |
| 4 | $A_2$: 66% | 8% | $C_1$: 20% | 5% |
| 5 | $A_1$: 66% | 8% | $C_1$: 25% | 0% |
| 6 | $A_1$: 66% | 8% | $C_1$: 20% | 5% |
| $E_1$ | $A_3$: 49.0% | 10% | $C_2$: 40% | 0% |
| $E_2$ | $A_3$: 91% | 8% | 0% | 0% |
| $E_3$ | $A_3$: 79% | 0% | $C_1$: 20% | 0% |

The fire-retardation and mechanical properties of these compositions are given in the table below:

| Properties | 1 | 2 | 3 | 4 | 5 | 6 | $E_1$ | $E_2$ | $E_3$ |
|---|---|---|---|---|---|---|---|---|---|
| Melt flow index, g/10 min | 24 | 25 | 22 | 8.5 | 11.5 | 25 | — | — | |
| Notched Charpy impact strength, $KJ/m^2$ | 2.1 | 2.1 | 2.2 | 2.1 | 4 | 3.7 | 2.4 | 3.6 | 6.3 |
| Unnotched Charpy impact strength, $KJ/m^2$ | 13.8 | 22.8 | 27.2 | 26.9 | 85 | 36.7 | 39 | 210 | 350 |
| Tensile strength, MPa | 75.2 | 86.6 | 77.8 | 86.7 | 79.8 | 87.6 | 85 | 60 | 70 |
| Elongation at break, % | 1.6 | 1.7 | 1.7 | 1.7 | 5.2 | 2.7 | 2.2 | 15 | 25 |
| Modulus, MPa | 6178 | 6796 | 5919 | 6981 | 5567 | 6242 | 4700 | 3100 | 3700 |
| UL-94 test 1.6 mm/0.8 mm | V0/V0 | V2/V0 | V2/V0 | V0/V2 | V0/V0 | V2/V0 | V2/V2 | V0/V2 | V2/V2 |
| Incandescent-filament test at 3/1.6/1 mm | 960/ 960/ 960 | 960/ 960/ 960 | 960/ 960/ 960 | 960/ 960/ 960 | 960/ 960/ 960 | 960/ 960/ 960 | 850/ 960/ 960 | 960/ 960/ 960 | 750/ 650/ 850 |
| Arc propagation resistance at 450 V | Good | Good | Good | Good | Good | Good | — | | |
| HDT (1.81 MPa) ° C. | 111 | 186 | 99 | 162 | 81 | 133 | — | | |

These tests show the synergistic effect of the melamine cyanurate/kaolin combination, since the melamine cyanurate results in a composition having poor mechanical properties while a composition with kaolin, but without any melamine cyanurate, has mediocre fire-retardation and incandescent-filament-resistance properties.

What is claimed is:

1. Polyamide-based composition comprising a fire-retardation system, wherein said fire-retardation system comprises a melamine derivative and calcined kaolin.

2. Composition according to claim 1, wherein the weight concentration of melamine derivative is between 1 and 30% by weight with respect to the weight of polyamide.

3. Composition according to claim 1, the weight concentration of kaolin is between 5 and 40% by weight with respect to the weight of polyamide.

4. Composition according to claim 1, wherein the melamine derivative is comprises melamine cyanurate, melamine phosphate, melamine polyphosphates or melamine pyrophosphates.

5. Composition according to claim 1, which comprises a reinforcing filler comprising glass fibres, mineral fibres or heat-resistant organic fibres.

6. Composition according to claim 1, wherein the fire-retardant system contains a mono-, di- or polycarboxylic acid.

7. Composition according to claim 6, wherein the mono-, di- or polycarboxylic acid is present in a weight concentration of between 0.01% and 3% with respect to the polyamide resin.

8. Composition according to claim 6, wherein the aforementioned acid comprises myristic acid, palmitic acid, stearic acid, behenic acid, benzoic acid, salicylic acid, oxalic acid, malonic acid, succinic acid, glutaric acid, adipic acid, pimelic acid, decanedioic acid, dodecanedioic acid, isophthalic acid, terephthalic acid and/or trimesic acid.

9. Article obtained by moulding or forming a composition according to claim 1.

10. A polyamide-based fire-retardant composition containing:
   (a) 1 to 30 wt. % of a melamine cyanurate, melamine phosphate, melamine polyphosphate or melamine pyrophosphate;
   (b) 5 to 40 wt % calcined kaolin;
   (c) 1 to 50 wt % glass fibers, mineral fibers or heat-resistant organic fibers; and
   (d) 0.01 to 3 wt % of a mono-, di- or polycarboxylic acid, the percentages based on the weight of the polyamide.

11. A composition according to claim 1, wherein the melamine derivative comprises a melamine phosphate, polyphosphate or pyrophosphate.

12. An article obtained by molding or forming a composition according to claim 10.

13. A polyamide-based composition comprising a fire-retardation system consisting essentially of a melamine derivative and calcined kaolin.

14. A composition according to claim 13, wherein the melamine derivative comprises a melamine cyanurate, a melamine phosphate, a melamine polyphosphate or a melamine pyrophosphate.

15. A composition according to claim 14, wherein the melamine derivative is present in an amount of 1 to 30 wt % and the kaolin is present in an amount of 5 to 40 wt %.

\* \* \* \* \*